Patented Oct. 26, 1937

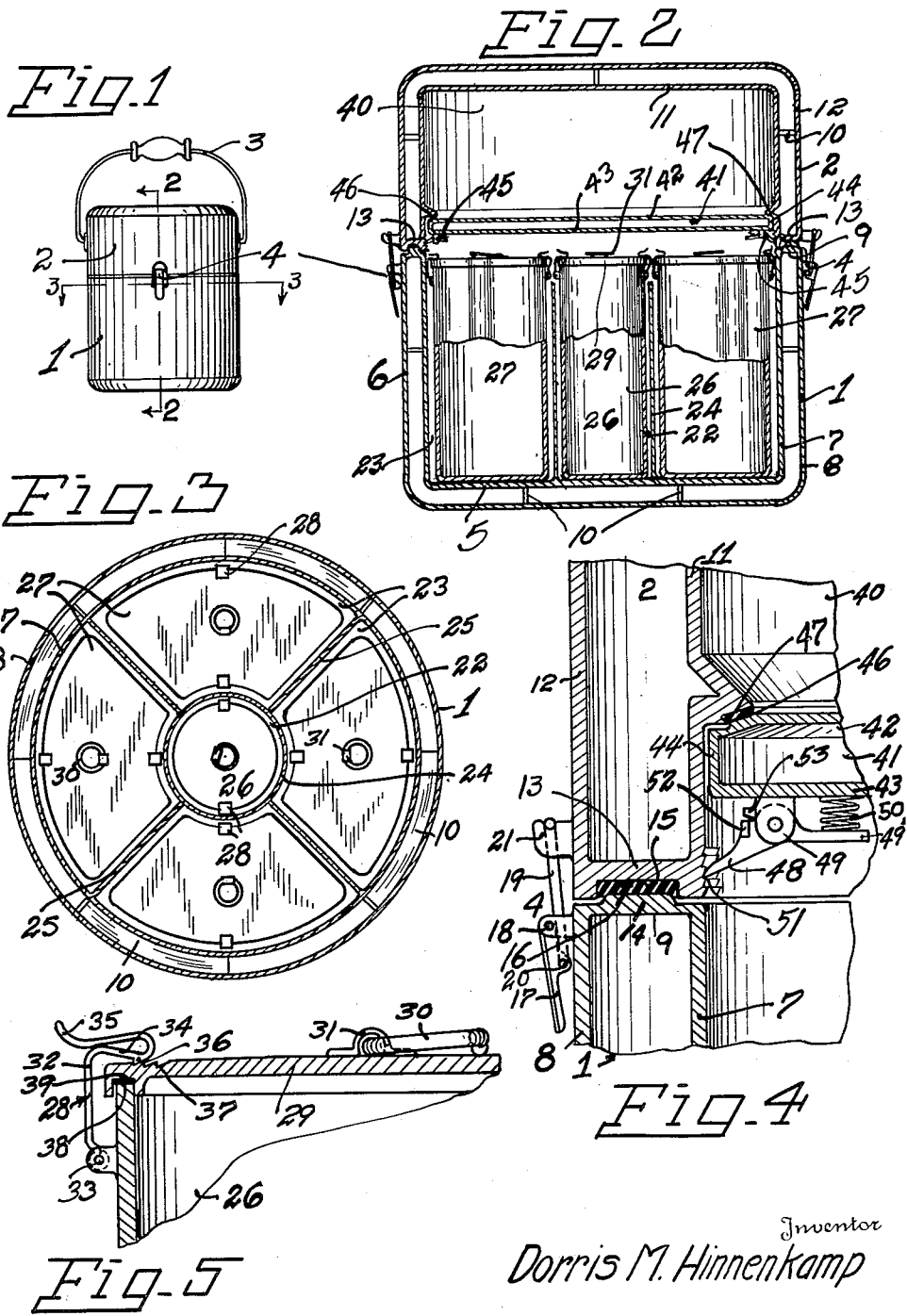

2,097,186

UNITED STATES PATENT OFFICE 2,097,186

THERMOS LUNCH KIT

Dorris M. Hinnenkamp, Spokane, Wash.

Application August 14, 1934, Serial No. 739,759

1 Claim. (Cl. 220—20)

This invention relates to an improved thermos lunch kit and one object of the invention is to provide a device of this character in which a plurality of receptacles are removably mounted in a container having insulated walls and the container provided with a cover or upper section constituting an auxiliary container.

Another object of the invention is to so form the container or body portion of the device that compartments will be provided therein to receive the removable receptacles and the container reinforced by partitions defining the compartments and prevented from being damaged if accidentally dropped or roughly handled.

Another object of the invention is to provide improved means for securely but detachably holding the upper section or cover in place upon the container and forming an air tight joint between the same and to also provide improved means for detachably holding a closure for a compartment in the cover in place.

Another object of the invention is to provide receptacles which may be easily slid into or drawn out of the compartments of the container and in addition provide these receptacles with covers having improved latches for securely holding them in place and preventing danger of the contents of the receptacles leaking from them if the lunch kit should be tilted out of an upright position while being transported from one place to another.

The invention is illustrated in the accompanying drawing wherein.

Figure 1 is a side elevation of the improved lunch kit.

Figure 2 is an enlarged sectional view taken vertically through the lunch kit along the line 2—2 of Figure 1.

Figure 3 is a section taken transversely through the kit along the line 3—3 of Figure 1.

Figure 4 is a fragmentary sectional view taken vertically through a side portion of the lunch kit.

Figure 5 is a fragmentary sectional view taken vertically through the upper portion of one of the removable receptacles of the lunch kit.

This improved lunch kit has a main section or container 1 and an upper auxiliary section or cover 2 to which is applied a bail or handle 3 in order that the kit may be easily lifted and carried from one place to another. The auxiliary section or cover is detachably secured by latches 4 at opposite sides thereof which serve to very securely hold the cover in place but may be easily released when it is desired to remove the cover and have access to the interior of the kit.

The container 1 is formed of metal and has a bottom and side walls 5 and 6 defined by inner and outer shells 7 and 8 united at their upper ends by a marginal strip or wall 9. Therefore the container will have a hollow bottom and walls defining a chamber from which air can be extracted to create a vacuum and insulate the interior of the container. Short rods 10 serving as spreaders are provided between the shells to prevent the shells from collapsing. The upper section or cover is also formed with inner and outer shells 11 and 12 united by a marginal wall 13 disposed over the marginal wall of the main section when the cover is in place and referring to Figure 4 it will be seen that the marginal wall of the main container is upwardly thickened intermediate its width to form a circumferentially extending rib 14 to bear against a gasket 15 seated in an annular recess 16 formed in the marginal wall of the cover and form a tight joint when the cover is clamped firmly into place.

The clamps 4 by means of which the cover or auxiliary section is secured against the upper end of the container are each formed as shown in Figure 4 and referring to this figure it will be seen that each consists of a lever 17 pivoted at one end to a lug or ear 18 projecting from a side of the container close to the upper end thereof. The lever carries an elongated loop or yoke 19 loosely mounted in ears 20 of the lever and of such length that it may extend upwardly and engage over an arm 21 projecting radially from the side wall of the cover. With the loop so engaged about the arm, the lever can be swung downwardly to a position close against the wall of the container and as the loop moves past a dead center during this movement the cover will be securely held in place with the rib 14 in compressing engagement with the gasket 15. Considerable effort is necessary to force the lever away from the container for movement towards a releasing position and therefore the lever will not accidentally slip and release the cover.

The container is divided into a central compartment 22 and side compartments 23 which encircle the central compartment by a circular partition 24 and radial partitions 25 and within the compartments are placed receptacles 26 and 27 each of which conforms to the contour of the compartment into which it fits. The partitions are of slightly less height than the receptacles and therefore when the receptacles are lowered into the compartments, latches 28 by which covers 29 are held upon the receptacles will not strike the partitions and be accidentally released.

It should also be noted that the receptacles have their upper ends spaced below the upper end of the container a sufficient distance to prevent danger of the latches being engaged by the cover and released when the cover is clamped to the container. Rings 30, by means of which the covers are to be lifted from the receptacles or held while being set in place, are engaged through eyes 31 and are pressed downwardly against the covers as shown in Figures 2 and 5 when the covers are in place where they will be out of the way and not prevent the upper section from being applied.

The latches are of identical construction and located at opposite sides of the receptacles. In Figure 5 one latch is illustrated in detail and referring to this figure it will be seen that each latch consists of a strip of resilient metal bent to form a shank 32 pivoted at one end to ears 33 projecting from a side of the receptacle. The other end portion of the strip of resilient material forms a bill 34 bent back upon itself to provide a trigger or finger engaging element 35 which projects outwardly beyond the shank to such an extent that when pressure is applied to this element the bill will be swung upwardly and the spur 36 moved out of engagement with the teeth 37 formed in the lid 29. When the latches are in operative engagement with the lid their resiliency will hold the lid against upward movement and hold the upper edge of the walls of the receptacle in compressing engagement with a gasket 38 mounted in an annular seat 39 formed about the under face of the lid. Liquid or semi-liquid substances will therefore be confined in the receptacles and prevented from leaking out of the same if the lunch kit should be tilted out of an upright position. In the preferred use of the lunch kit, water, coffee or other drinks will be poured into the center receptacle and soup, meats or other food placed in the side receptacles. The receptacles may have a double wall construction similar to that of the container if so desired.

The upper section not only serves as a cover for the container 1 but also as a container for sandwiches, fruit or other articles which it is desired to take when going on an outing and in order to close the chamber 40 defined by the cover there has been provided a lid 41 having inner and outer walls 42 and 43 united by a marginal wall 44 extending circumferentially thereof. A vacuum is formed in this lid and the outer wall carries latches 45 for releasably holding the lid in place with the inner wall pressed tightly against a gasket 46 which bears against a flange or shoulder 47 extending circumferentially of the inner wall of the cover and formed by crimping a portion of this wall.

The latches 45 are disposed opposite each other and each consists of a pawl 48 pivoted to an ear 49 carried by the outer wall of the lid. An actuating lever 49' projects from the pawl and is engaged by a spring 50 which yieldably holds the pawl in position to engage rack teeth 51 formed upon the wall of the cover. It will thus be seen that the lid can be thrust into place after sandwiches and the like have been packed in the chamber 40 and it will be prevented from dropping away from the shoulder 47 when the cover is set in place upon the container. By pressing upon the lever the latch can be moved to a releasing position and the lid lifted from the shoulder and removed. A tongue 52 which projects from one side of the pawl is provided to engage an abutment 53 carried by the ear 49 and prevent the pawl from rocking to such a position that the spring can slip out of place when the lid is removed.

When this improved lunch kit is in use the receptacles are filled and placed in the compartments of the container, after which the compartment of the cover or upper section is packed with sandwiches and the lid 41 thrust into place. The cover is then inverted and set in place upon the container where it is secured by the latches 4 and the device can then be lifted by its handle 3 and carried from one place to another. When the contents of the lunch kit are to be used the latches 4 are released and the upper section or cover removed and set upon the ground or on a table with its open end uppermost. The latches 45 are then released by pressing upon the levers 49', and the lid 41 removed, thus giving access to the chamber 40 and permitting sandwiches to be removed. The receptacles 26 and 27 can then be withdrawn from the chambers 22 and 23 of the main container by grasping the rings 30 and drawing them upwardly and pressure will then be applied to the triggers 35 to spring the bills of the latches 28 upwardly out of engagement with the lids 29 and these latches will drop downwardly against sides of the receptacles where they will be out of the way and not interfere with removal or temporary replacement of the lids. Hot coffee or cold water will be poured from the receptacle 26 and contents of the receptacles 27 may be served in any desired manner. When no longer needed, the receptacles will be returned to the compartments of the main container, the lid of the auxiliary container replaced and the auxiliary set in place upon the main container and secured by its latches.

Having thus described the invention, what is claimed as new is:

In a lunch kit, a container open at its upper end, said container being partitioned to form a center compartment and side compartments surrounding the center compartment, receptacles fitting within the compartments, lids for said receptacles, and latches carried by side walls of said receptacles externally thereof and movable into and out of position to engage the lids and releasably secure the lids in place to close the receptacles, the partitions being of less height than the receptacles and terminating below the latches in spaced relation thereto whereby the latches will not strike the partitions and be accidentally released when the receptacles are placed in the compartments.

DORRIS M. HINNENKAMP.